(12) United States Patent
Badiali

(10) Patent No.: US 8,281,690 B2
(45) Date of Patent: Oct. 9, 2012

(54) INDEXABLE OFFSET ADAPTOR

(75) Inventor: John A. Badiali, Englewood, FL (US)

(73) Assignee: Custom Spec Engineering, Inc., Englewood, FL (US)

( * ) Notice: Subject to any disclaimer, the term of this patent is extended or adjusted under 35 U.S.C. 154(b) by 193 days.

(21) Appl. No.: 12/761,065

(22) Filed: Apr. 15, 2010

(65) Prior Publication Data

US 2010/0263494 A1    Oct. 21, 2010

Related U.S. Application Data

(60) Provisional application No. 61/169,347, filed on Apr. 15, 2009.

(51) Int. Cl.
*B25B 17/00* (2006.01)
*B25B 21/00* (2006.01)

(52) U.S. Cl. .................................. 81/57.12; 81/57.28

(58) Field of Classification Search ............... 81/57.12, 81/57.13, 57.28, 57.29, 57.45
See application file for complete search history.

(56) References Cited

U.S. PATENT DOCUMENTS

| | | | | | |
|---|---|---|---|---|---|
| 2,179,724 | A | * | 11/1939 | Kuehne | 81/475 |
| 4,171,651 | A | * | 10/1979 | Dacunto | 81/57.29 |
| 4,643,052 | A | * | 2/1987 | Badiali | 81/57.28 |
| 5,863,159 | A | * | 1/1999 | Lasko | 408/124 |
| 6,089,331 | A | * | 7/2000 | Christ | 173/216 |
| 6,272,952 | B1 | * | 8/2001 | Hsu et al. | 81/57.22 |
| 6,463,824 | B1 | * | 10/2002 | Prell et al. | 74/417 |
| 7,191,677 | B2 | * | 3/2007 | Barkdoll | 74/396 |

* cited by examiner

*Primary Examiner* — David B Thomas
(74) *Attorney, Agent, or Firm* — Gifford, Krass, Sprinkle, Anderson & Citkowski, P.C.

(57) ABSTRACT

An adaptor for a power drill includes an offset drive and means to adjust the rotated position of said offset drive with respect to the chuck of the drill.

2 Claims, 3 Drawing Sheets

INDEXABLE OFFSET ADAPTOR

CROSS-REFERENCE TO RELATED APPLICATIONS

This Application claims the benefit of U.S. Provisional Application 61/169,347 filed on Apr. 15, 2009, which is incorporated herein by reference.

FIELD OF THE INVENTION

The present invention relates to accessories for power drills and more particularly to a quick change indexable offset drive head adaptor to enable the angle of the drive of a power drill to be readily changed.

BACKGROUND OF THE INVENTION

Power drills, both electric and pneumatic, have a wide variety of uses and are well known to those in the art. In some instances, a screw, bolt, etc., can be located in very tight and/or difficult to reach space and result in insufficient room to insert and place a screwdriver, wrench, and the like onto the head of the screw, bolt, etc., in order to insert and/or remove the item. When such a tight space is encountered, an individual can use a specialized tool such as a short screwdriver, specially made wrench and the like. In some instances, an offset drive head adaptor can be placed onto a power drill, the offset drive head providing a generally ninety degree change of orientation in the rotation axis of the power drill. In this manner, the drilling, tightening, loosening and the like can be accomplished in the tight and/or difficult to reach space.

Previous offset drive head adaptors have been relatively complex and once attached to a power drill, are fixed relative to the direction in which the offset drive head faces in relation to the power drill. As such, when such an offset drive head adaptor is attached to the power drill and the angle which the offset drive head faces is not capable of reaching a desired location, the adaptor must be removed from the power drill and repositioned, if possible. Therefore, an improved offset drive head adaptor that provides for a quick change of the direction which the drive head faces relative to the power drill would be desirable.

SUMMARY OF THE INVENTION

The present invention discloses a quick change indexable offset drive head adaptor. As such, the adaptor has utility as a mechanical device.

The offset drive head adaptor disclosed herein includes a collar that is dimensioned to fit at least partially around and/or onto a body of a power drill. Extending from the collar can be an extension member that extends from the collar to an offset drive. The offset drive has a shaft housing and a gear housing. The shaft housing has a shaft with a power drill end and a gear end, the power drill end of the shaft extending from the shaft housing generally towards the collar and dimensioned to fit at least partially within a chuck of the power drill. The gear end of the shaft is attached to a first gear within the gear housing. The gear housing has the first gear and a second gear. The first gear and the second gear are engaged with each other and operable to translate rotation of the shaft to an outlet chuck extending from the gear housing, the outlet chuck being offset at an angle to the shaft. The gear housing is also rotatable about the shaft housing such that it can be made to face any direction relative to the gear housing and the collar. A slide release can be provided which is operable to index the gear housing at any one of a plurality of positions relative to the shaft housing.

BRIEF DESCRIPTION OF THE DRAWINGS

A better understanding of the adapter of the present invention will be had upon review of the included drawings in which.

DETAILED DESCRIPTION OF THE PREFERRED EMBODIMENT

Figure 1:
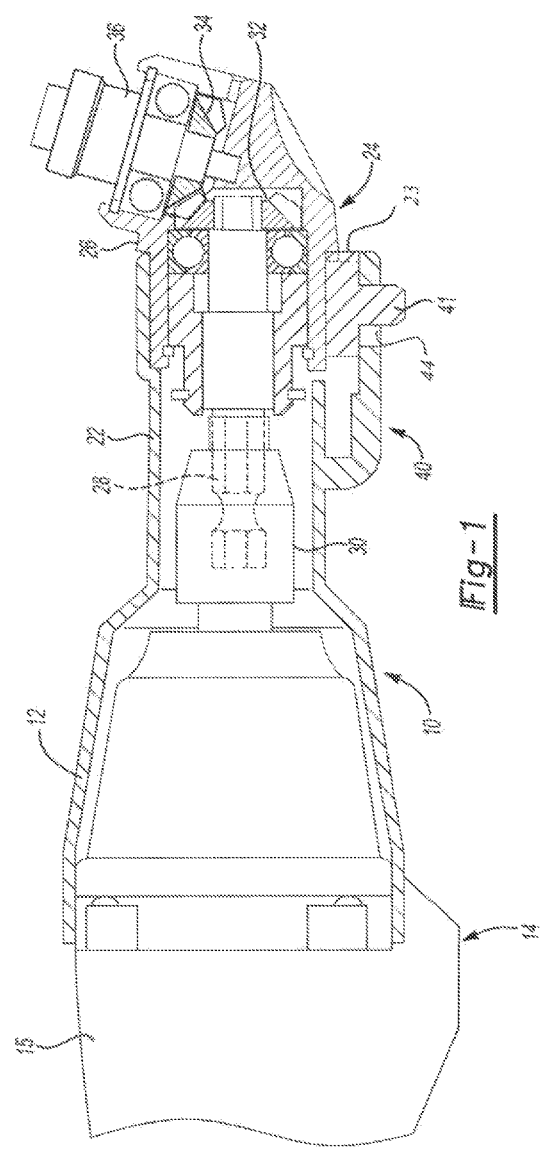
FIG. 1 is a cross sectional view of the adaptor of the present invention mounted to a power drill.
Figure 2:
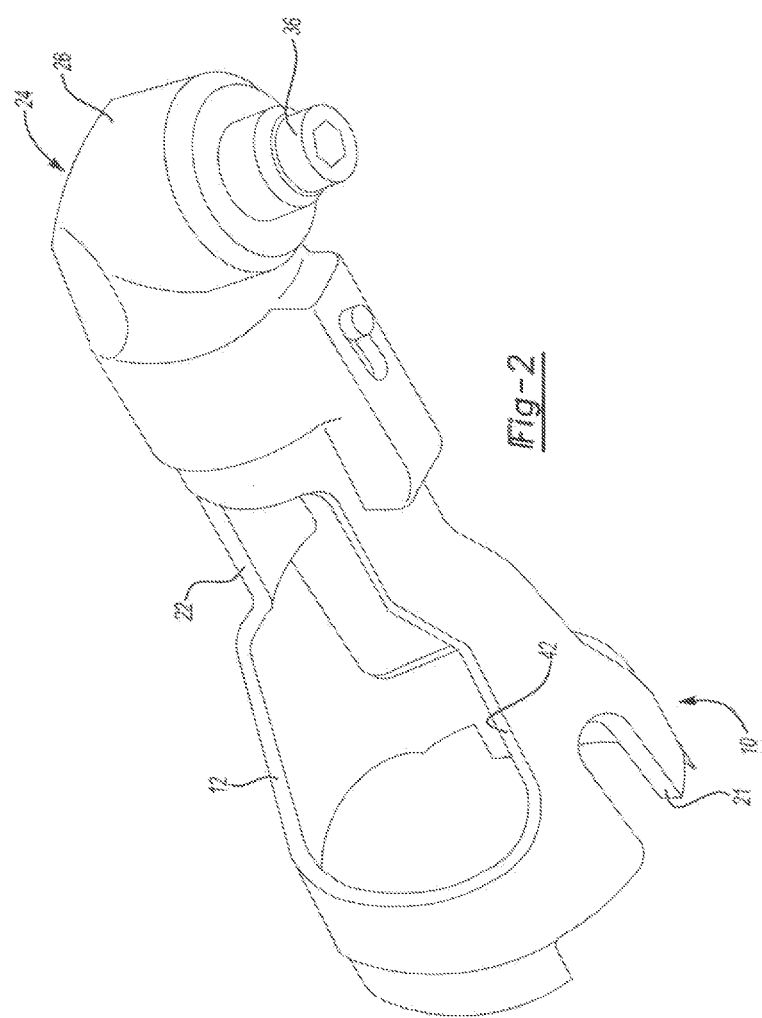
FIG. 2 is a perspective view of the adaptor of the present invention.
Figure 3:
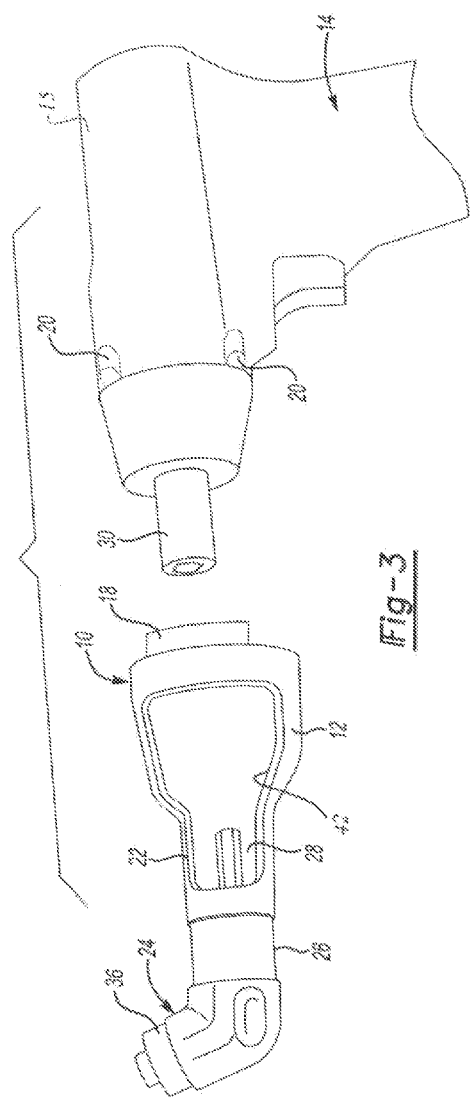
FIG. 3 is an elevational view illustrating the manner of mounting the adaptor of the present invention to a power drill.

Turning now to FIGS. 1-3, an embodiment of the offset drive head adaptor is shown generally at reference numeral 10. The adaptor 10 includes a collar 12 dimensioned such that it can fit around and onto a power drill 14 as shown in FIGS. 1 and 3.

As best seen in FIG. 3 the collar 12 can have one or more tabs 18 which engage with spaced protrusions 20 on the housing 15 power drill 14 to prevent rotation of the collar 12 upon axial mounting of the collar 12 to the drill 14. Slots 21 (FIG. 2) permit the collar 10 to expand radially to accommodate the housing 15 of the drill 14

An extension member 22, includes a shaft housing 23, extends from the collar 12 of the adaptor 10 and provides a structural link between the collar 12 and an offset drive 24. The offset drive 24 includes a gear housing 26. As best seen in FIG. 3 a drive shaft 28 is mounted within the housing 26 and when the adaptor 10 is mounted to the drill 14 extends axially to engage with the chuck 30 (FIG. 1) of the power drill 14 so that actuation of the power drill 14 provides rotation to the shaft 28. In some instances, the shaft 28 can be retained and released entirely by a quick release chuck (not shown) on the power drill 14.

Still referring to FIG. 1, a first gear 32 mounted to the end of the drive shaft 28 drives an offset or second gear 34. The gears 32 and 34 are engaged as known to those skilled in the art such that the rotation of the shaft 28 is translated to an outlet drive 36 of the adaptor 10. In this manner, when the end of the shaft 28 is mounted to the chuck 30 of the power drill 14 and the chuck 30 is tightened onto the shaft 28, rotation of the chuck 30 will cause the shaft 28 to rotate the outlet drive shaft 36 through the gears 32 and 34 of the adaptor 10. An opening 42 (FIG. 3) in the collar 10 permits access to the chuck 30 to permit it to be tightened about the end of the shaft 28. It should be appreciated that the offset of the shaft 36 relative to the shaft 28 affords for the shaft 36 and/or a tool placed therein to reach tight and/or difficult to reach spaces.

Looking specifically at FIG. 3, it is appreciated that the collar 10 can snapped unto the drill housing 15 in any desired rotated position with respect to the axis of the chuck 30 so that the outlet drive 36 can be made to face a selected position relative to the power drill 14 to permit the power drill 14 to be operated to reach any of a number of permitted offset positions. In some instances, and as best seen in FIG. 1 a slide release 40 can be included, the slide release 40 being operable to index the housing 26 to a plurality of rotated positions with respect to the housing 23 about the shaft axis 28 upon movement of the slide 41 in the direction of the arrow in 43 as shown in FIG. 1. Still referring to FIG. 1 the slide 41 is movable out of and into one of a plurality of mating slots 42, only one of which is shown, disposed about the periphery of the housings 23 and 26 to lock and unlock the housings together at a number of rotated positions of the housings 23 and 26. Moving the slide 41 out of the slot 44 permits rotation of the housing 26 with respect to the housing 23. The slide 41 then can be moved axially to the next slot (not shown to lock the housing 23 to the housing 26 in the new rotated position.

It should appreciated that the adaptor 10 can be compact and lightweight with the collar 12 made from a light and somewhat resilient material such as aluminum, aluminum alloys, magnesium, magnesium alloys, plastics, fiber reinforced plastics and the like. Such a lightweight and resilient adaptor 10 can be easily attached and removed from the power drill 14 to be re-attached in a new rotated position to adjust the position of the offset drive 36 with respect to the chuck 30.

In operation, an individual can take a power drill 14 and place the adaptor 10 thereon as best illustrated in FIGS. 1 and 3. It should appreciated that the placement of the adaptor 10 onto the power drill 14 involves inserting the inlet shaft 28 at least partially within the chuck 30 and accessing the chuck 30 through the opening 42 to tighten the chuck 30 onto the inlet shaft 28 to thereby drivingly engage the chuck 30 with the offset drive 36. After the adaptor 10 has been placed onto the power drill 14 and the chuck 30 tightened onto the inlet shaft 28, the offset drive 36 is engaged with the power drill 14. Upon examining the location of the item to be removed or inserted using the power drill 14 and the adaptor 10, the individual can rotate the housing 23 relative to the housing 26 by using the slide lock 40 so the outlet drive shaft 36 faces a desirable direction. After, or in the alternative before, the proper positioning of the outlet drive 36 has been obtained, a tool such as a socket, screw bit and the like (not shown) can be inserted within the outlet drive 36. Thereafter, the tool within the outlet drive can be attached to the desired item in order to remove and/or insert it as desired. Thereafter, if another item is desired to be removed and/or inserted, and it is at a different location, the outlet drive 36 can be quickly and easily indexed to a different position using the slide release 40. In this manner, a quick change indexable offset drive head adaptor is provided.

It is to be understood that various modifications are readily made to the embodiments of the present invention described herein without departing from the scope and spirit thereof. Accordingly, it is to be understood that the invention is not to be limited by the specific illustrated embodiment, but by the scope of the appended claims.

I claim:

1. An offset drive head adaptor comprising:
   a collar dimensioned to snap over and be mounted to a power drill;
   an extension member extending from said collar; and
   an offset drive attached to said extension member;
   said offset drive having a housing and a drive shaft disposed within said housing;
   said shaft dimensioned to fit at least partially within a chuck of the power drill;
   at least two gears mounted within said housing with a first gear mounted to said shaft and said two gears operable to translate rotation of said shaft to an outlet drive shaft extending in an offset manner from said housing;
   said offset drive also having a slide release operable to permit said offset drive to be rotated with respect to an axis of said drive shaft and to be locked in a rotated position with respect to the chuck of said drill.

2. A quick change indexable offset drive head adaptor, said adaptor comprising:
   a collar dimensioned to fit onto a housing of a power drill, said collar having a tab operable to prevent said collar from rotating about said power drill housing;
   an extension member extending from said collar; and
   an offset drive attached to said an extension member, said extension member spacing said offset drive apart from said collar;
   said offset drive having a shaft housing;
   a shaft mounted within said housing and having a power drill end extending from said housing generally towards said collar and a gear end attached to a first gear in said housing, said shaft dimensioned to fit at least partially within a chuck of the power drill;
   a gear housing having said first gear and a second gear, said first and second gears engaged with each other and with said shaft and operable to translate rotation of said shaft to an outlet drive shaft extending from said gear housing, said gear housing also rotatable about said shaft housing;
   said offset drive also having a slide release operable to permit said gear housing to be rotated to and locked in selected positions with respect to said shaft axis of said shaft housing.

\* \* \* \* \*